June 16, 1959    R. L. SMIRL ET AL    2,890,600
TRANSMISSION
Filed June 11, 1956
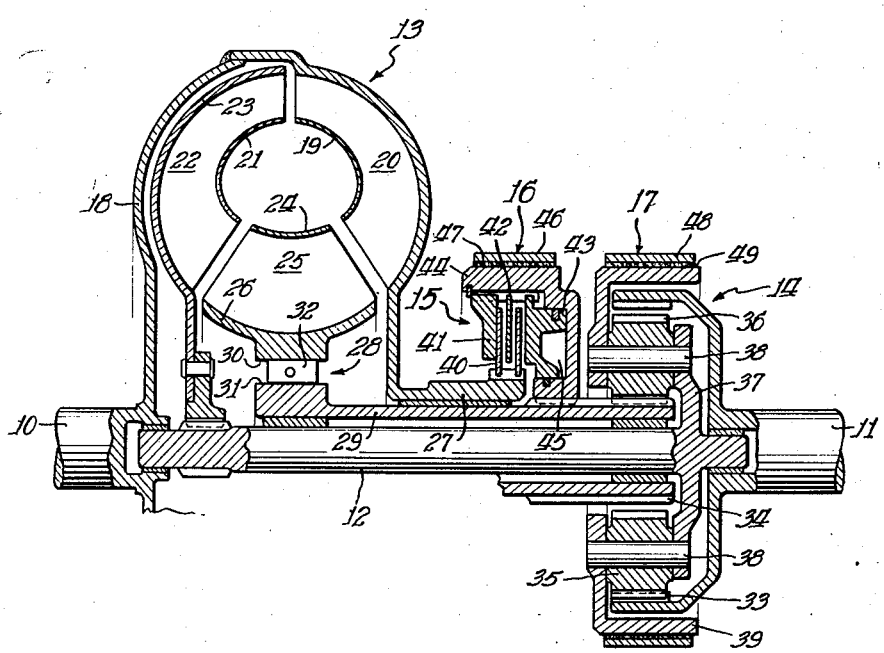
Inventors:
Richard L. Smirl and
Miczyslaw J. Waclawek
By:
Keith J. Bleuer   Atty.

United States Patent Office 2,890,600
Patented June 16, 1959

2,890,600

TRANSMISSION

Richard L. Smirl and Miczyslaw J. Waclawek, Chicago, Ill., assignors to Borg-Warner Corporation, Chicago, Ill., a corporation of Illinois Application June 11, 1956, Serial No. 591,512

5 Claims. (Cl. 74—677)

Our invention relates to transmissions for automotive vehicles and particularly to transmissions comprising hydraulic torque converters for transmitting drive between the drive shaft and driven shaft of an automotive vehicle.

In co-pending application S.N. 428,917 of Richard L. Smirl, filed May 11, 1954, there is disclosed a transmission including a planetary gear set connected in tandem with a hydraulic torque converter for providing a low speed drive, a high speed drive, and a drive in reverse. The planetary gear set comprises a ring gear, a sun gear, a plurality of planet gears, and a planet gear carrier. The planet gear carrier is driven by the turbine element of the torque converter; the sun gear is driven by the stator element of the torque converter; and the ring gear is connected to the driven shaft. For low speed drive, the sun gear is held against rotation for providing torque multiplication through the planetary gear set and the driven shaft is driven at a torque which is the product of torque multiplication produced by the hydraulic torque converter and the planetary gear set. For high speed drive, a clutch is provided for directly connecting the driven shaft to the drive shaft whereby the high speed drive is a direct drive from the drive to the driven shaft. For reverse drive the turbine element of the torque converter is held stationary and the stator drives the driven shaft in a reverse direction.

It is an object of the present invention to provide a transmission of this type which includes a clutch for connecting the drive shaft of the vehicle with one of the elements of the planetary gear set whereby in high speed drive, there is a two path power flow to the driven shaft, one element of the gear set being driven by the turbine element of the hydraulic torque converter and another element of the gear set being driven by the drive shaft through the clutch. A portion of the torque is thus transmitted through the converter. The use of the two path power flow in high speed drive has the advantage of retaining the efficiency of a direct drive clutch while giving the cushioning effect of a torque converter.

In transmissions of the general type wherein a planetary gear set is connected in tandem with a torque converter to provide two forward speed drives, the gear ratio for low speed drive must be used for the passing gear and also for hill braking. It is desirable to have a mild gear ratio such as 1.5 to 1 for passing but such a ratio is inadequate for hill braking. Consequently, a good passing gear must be sacrificed in order to obtain adequate hill braking. A further object of the present transmission is to provide both adequate hill braking and a good passing gear ratio. It is contemplated that hill braking be obtained by engaging the clutch and at the same time holding the turbine element of the torque converter stationary so that hill braking is separate and distinct from the passing gear.

The invention consists of the novel constructions, arrangements and devices to be hereinafter described and claimed for carrying out the above stated object and such other objects as will appear from the following description of a preferred embodiment of the invention illustrated with reference to the accompanying drawings which is a schematic illustration of the transmission embodying the principles of the invention.

Referring to the drawing, the transmission, in general, comprises a drive shaft 10, a driven shaft 11, an intermediate shaft 12, a torque converter 13, a planetary gear set 14, a clutch 15, and two friction brakes 16 and 17.

The hydraulic torque converter 13 includes a housing 18 connected to said drive shaft 10 and adapted to be driven thereby. The torque converter 13 also includes an impeller 19, the hollow shell of which is a part of and is integral with the converter housing 18 and having spaced blades 20 fixed within the housing. The converter 13 includes also a turbine or driven element 21 having spaced blades 22 fixed to an outer shell 23. The torque converter also includes a stator 24 having spaced blades 25 fixed to an outer shell 26. The impeller 19 is connected to a sleeve shaft 27 and the turbine 21 of the torque converter is splined to the intermediate shaft 12. A one-way device 28 is provided between the stator 24 and a sleeve shaft 29. The one-way device 28 may be of conventional construction and comprises an inwardly facing cylindrical race surface 30 formed integrally with the outer shell 26 of the stator 24; an outwardly facing cylindrical race surface 31 formed integrally with the sleeve shaft 29, and a plurality of tiltable sprags 32 disposed between the surfaces 30 and 31. The sprags 32 are so disposed that they grippingly engage the surfaces 30 and 31 to prevent rotation of the stator 24 in the reverse direction, that is, in the direction opposite to that in which the shaft 10 is driven from the engine of the vehicle, assuming that the shaft 29 is stationary, and the sprags 32 tilt to release the stator 24 with respect to the shaft 29 and allow its free rotation in the forward direction.

The torque converter 13 is of conventional construction, there being fluid contained in the housing 18. The turbine 22 is driven initially at an increased torque with respect to that applied on drive shaft 10, and the reaction element or stator 24 takes the reaction for providing this increase torque. During this operation, the stator 24 tends to rotate reversely with respect to the direction of rotation of the drive shaft 10 but is held stationary by the shaft 29 and the one-way device 28. After a predetermined speed of rotation of the turbine 21 is reached, the reaction of the stator 24 at this time changes from the reverse direction to the forward direction, and the stator then rotates in the forward direction, being free for such rotation due to a releasing of the tiltable grippers 32 of the one-way device 27. The torque converter 13 thereafter functions as a simple two element fluid coupling, and the turbine 21 during this period of operation is driven at the same torque as that applied on the drive shaft 10.

The planetary gear set 14 comprises a ring gear 33 which is connected to the driven shaft 11, a sun gear 34 formed on the shaft 29, planet gears 35 in mesh with the ring gear 33, planet gears 36 in mesh with the sun gear 34 and each in mesh with the planet gears 35, and a planet gear carrier 37 for the planet gears 35 and 36. The planet gear carrier 37 has stub shafts 38 on which the planet gears 35 and 36 are rotatably disposed, and an outer hollow drum portion 39. The planet gear carrier 37 is connected to the shaft 12.

The clutch 15 comprises a plurality of cluch discs 40 fixed to the shaft 27. The clutch discs 40 are stacked between an end pressure plate 41, a clutch plate 42, and an annular piston 43 all of which are splined to a drum 44. The annular piston 43 is slidably disposed in an annular cavity 45 provided in the shell 44, and the piston 43 is adapted to act to compress the discs 40 and the plates 41 and 42 together into frictional engagement.

The brake 16 comprises a brake band 46 adapted to be contracted on a cylindrical drum surface 47 on the exterior of the shell 44. The brake 17 comprises similar friction band 48 adapted to engage a cylindrical drum surface 49 on the exterior of the drum 39. The brake bands 46 and 48 may be contracted on their respective drum surfaces by any suitable conventional brake applying servo motors, such as those including fluid pressure operative pistons effective on one end of the friction bands.

In operation, the transmission provides a low speed forward drive completed by the engagement of the brake 16, a high speed forward drive completed by the engagement of the clutch 15 and a reverse drive completed by engagement of the brake 17.

The low speed forward drive is completed by engaging the brake 16 by applying band 46 to the drum surface 47. The brake 16 functions to hold the sun gear 34 against rotation and, through the shaft 29 and the one-way device 28, functions to hold the stator 24 against reverse rotation. The drive in low speed forward is from the drive shaft 10 to the torque converter 13, the impeller 19, the turbine 21, the shaft 12, the carrier 37 for the planet gears 35 and 36 and the ring gear 33 to the driven shaft 11. Since the planetary gear set 14 is of the dual pinion type, having two planet gears 35 and 36 in series between the sun gear 34 and the ring gear 33, the ring gear 33 and the driven shaft 11 will be driven at increased torque and reduced speed from the shaft 12, which functions as a drive shaft with respect to the gear set 14. The torque converter 13 functions to provide a drive at increased torque to its output shaft 12 with the stator 24 being held stationary by the one-way brake 28 and the friction brake 16, so that the shaft 11 is driven at an increased torque which is the product of the torque multiplication produced by the torque converter 13 and the gear set 14. When the speed of the turbine 21 increases sufficiently, the turbine and its output shaft 12 are driven at the same torque as the drive shaft 10, and, at this time, the torque multiplication between the shaft 10 and 11 is produced solely by the planetary gear set 14.

For high speed forward drive, the friction brake 16 is disengaged and the clutch 15 is engaged. In high speed forward drive there are two power paths from the drive shaft 10 to the planetary gear set 14. One of the power paths exists from the drive shaft 10 through the impeller 19, the turbine 21, the shaft 12 to the carrier 37. The other path exists from the drive shaft 10 to the converter housing 18, the shaft 27 through the clutch 15, to the shaft 29 to drive the sun gear 34. The two power paths are recombined in the planetary gear set 14. Assuming that the torque converter 13 is functioning as a fluid coupling, that is, that all the elements of the torque converter rotate at substantially the same speed, the sun gear 34 and the carrier 37 rotate at substantially the same speed. In effect, the gear set 14 is locked up so that all of the elements of the gear set rotate together and the ring gear 33 and the driven shaft 11 are driven at the same speed as the drive shaft 10.

Reverse drive is obtained by engaging the brake 17 while maintaining the clutch 15 and the brake 16 disengaged. The brake 17 is engaged by applying the brake band 48 to the cylindrical surface 49. The brake 17 functions to hold the turbine 21 of the torque converter stationary since the carrier 37, on which the brake surface 49 is provided, is connected with the turbine 21 through the shaft 12. With the turbine 21 stationary and with the impeller 19 being driven in the forward direction from the shaft 10, the reaction on the stator 24 is in the reverse direction, and the stator rotates in this direction. Such rotation is transmitted through the one-way engaging device 28, which now functions as a one-way clutch, to the shaft 29, the sun gear 34, the planet gears 35 and 36 and the ring gear 33 to the driven shaft 11. The carrier 37 for the planet gears 35 and 36 is held stationary as just described, and the brake thus has the two fold function of holding the carrier 37 against rotation and holding the turbine 21 against rotation and taking the reaction from both the carrier 37 and the turbine 21. Since the planet gear set 14 is of the dual pinion type, the ring gear 33 and thereby the driven shaft 11 are driven at an increased torque and reduced speed with respect to the shaft 29 which functions under these conditions as the drive shaft for the gear set 14, the shaft 29 being driven in a reverse direction by the stator 24 as has just been described.

Braking the vehicle by means of the vehicle engine is, of course, possible in either low speed forward drive or high speed forward drive with the brake 16 or the clutch 15 respectively engaged, since both of these drives are two-way drives. An augmented engine braking effecting for movement forwardly can be produced by a simultaneous engagement of the clutch 15 and the brake 17. The clutch 15, as previously described, when engaged, couples the sun gear 34 to the drive shaft 10. Engagement of the brake 17 holds the turbine 21 and the carrier 37 stationary. The turbine 21, when stationary, functions to considerably retard the rotation of the impeller 19 through the fluid of the torque converter 13. The carrier 37, when held stationary by the brake 17, acts as the reaction element of the gear set 14 and the driven shaft thus drives the sun gear 34, the shaft 27, the impeller 19, the converter housing 18, the drive shaft 10 and the vehicle engine at an overdrive, the engine rotating at approximately three times the rotation of the driven shaft 11. Thus the vehicle engine and the fluid of the converter are used to effect braking of the vehicle.

From the foregoing description, it can be seen that there has been provided an improved transmission which provides a two path power flow in high speed drive which gives both the desired cushioning effect of a torque converter and the efficiency of a direct connection between the drive and driven shafts. Our improved transmission also has the advantage of better gear selection due to the use of the particular type of vehicle braking.

While we have described our invention in connection with a certain specific embodiment thereof, it is to be understood that this is by way of illustration and not by way of limitation and the scope of our invention is defined solely by the appended claims which should be construed as broadly as the prior art will permit.

We claim:

1. In a transmission, the combination of a drive shaft, a driven shaft, an intermediate shaft disposed between said drive and driven shafts, a hydrodynamic coupling device comprising an impeller and a turbine, said impeller being connected to be driven by said drive shaft, a planetary gear set having a sun gear element and a ring gear element and a plurality of planet gear elements and a planet gear carrier, all of said gear elements being drivingly interconnected and said ring gear being connected to said driven shaft, said planet gear carrier being connected to said turbine by means of said intermediate shaft, brake means for said sun gear for providing a low speed power train between said drive and driven shafts, and a clutch for connecting said sun gear to said drive shaft for providing a split high speed power train which extends from said drive shaft to said sun gear through said clutch and from said drive shaft to said planet carrier through said torque converter.

2. In a transmission, the combination of a drive shaft, a driven shaft, an intermediate shaft disposed between said drive and driven shafts, a hydrodynamic coupling device comprising an impeller and turbine and a stator, said impeller being connected to be driven by said drive shaft, a planetary gear set having a sun gear element and a ring gear element and a plurality of planet gear elements and a planet gear carrier, said ring gear being connected to said driven shaft, all of said gear elements being drivingly interconnected and said planet gear carrier being connected to said turbine by means of said intermediate shaft, brake means for said sun gear for providing a low speed power train between said drive and driven shafts, a one-way engaging device between said stator and said sun gear, brake means for said sun gear for providing a low speed power train, a clutch for connecting said sun gear to said drive shaft for providing a split high speed power train which extends from said drive shaft to said sun gear through said clutch and from said drive shaft to said planet carrier through said torque converter, and brake means for said turbine for providing a reverse drive.

3. In a transmission, the combination of a drive shaft, a driven shaft, a hydraulic torque converter comprising an impeller and a turbine and a stator, said impeller being connected to said drive shaft, a planetary gear set comprising a plurality of planet gears and a planet gear carrier and a gear element in mesh with said planet gears on one side thereof and a gear element in mesh with said planet gears on the other side thereof, said planet carrier being connected to said turbine and one of said gear elements being connected to said driven shaft, the other of said gear elements being connected with said stator, a brake for the other of said elements for completing a low speed drive from said impeller to said turbine and through said planetary gear set with the reaction of said stator being taken through said gear set, and a clutch for connecting the other of said gear elements with said drive shaft for completing a two path power flow drive from said drive shaft to said driven shaft through said torque converter and said planetary gear set.

4. In a transmission for an automotive vehicle, the combination of a drive shaft, a driven shaft, an intermediate shaft disposed between said drive and driven shafts, a hydrodynamic coupling device comprising an impeller and a turbine, said impeller being connected to be driven by said drive shaft, a planetary gear set having a sun gear element and a ring gear element and a plurality of planet gear elements and a planet gear carrier, all of said gear elements being drivingly interconnected and said ring gear being connected to said driven shaft, said planet gear carrier being connected to said turbine by means of said intermediate shaft, a clutch for connecting said sun gear to said drive shaft for providing a split high speed power train which extends from said drive shaft to said sun gear through said clutch and from said drive shaft to said planet carrier through said torque converter, and brake means for said turbine, and means for simultaneously engaging said clutch and said brake means whereby to provide braking for the vehicle.

5. In a transmission for an automotive vehicle, the combination of a drive shaft, a driven shaft, an intermediate shaft disposed between said drive and driven shafts, a hydrodynamic coupling device comprising an impeller and a turbine, said impeller being connected to be driven by said drive shaft, a planetary gear set having a sun gear element and a ring gear element and a plurality of planet gear elements and a planet gear carrier, all of said gear elements being drivingly interconnected and said ring gear being connected to said driven shaft, said planet gear carrier being connected to said turbine by means of said intermediate shaft, brake means for said sun gear for providing a low speed power train between said drive and driven shafts, a one-way engaging device between said stator and said sun gear, brake means for said sun gear for providing a low speed power train, a clutch for connecting said sun gear to said drive shaft for providing a split high speed power train which extends from said drive shaft to said sun gear through said clutch and from said drive shaft to said planet carrier through said torque converter, brake means for said turbine for providing a reverse drive, and means for simultaneously engaging said clutch and said brake means whereby to provide braking for the vehicle.

References Cited in the file of this patent

UNITED STATES PATENTS

| | | |
|---|---|---|
| 2,312,849 | Pollard | Mar. 2, 1943 |
| 2,494,466 | Wolf | Jan. 10, 1950 |
| 2,695,533 | Pollard | Nov. 30, 1954 |

UNITED STATES PATENT OFFICE

CERTIFICATE OF CORRECTION

Patent No. 2,890,600                                                     June 16, 1959

Richard L. Smirl et al.

It is hereby certified that error appears in the printed specification of the above numbered patent requiring correction and that the said Letters Patent should read as corrected below.

Column 4, line 73, after the word "shaft" strike out "all of said gear elements being drivingly interconnected and" and insert the same after "carrier," in line 72, same column.

Signed and sealed this 10th day of November 1959.

(SEAL)
Attest:

KARL H. AXLINE
Attesting Officer

ROBERT C. WATSON
Commissioner of Patents